United States Patent [19]

Yagi

[11] Patent Number: 4,494,089

[45] Date of Patent: Jan. 15, 1985

[54] PULSE PHASE MODULATOR/DEMODULATOR SYSTEM

[75] Inventor: Taizo Yagi, Kyoto, Japan

[73] Assignee: Horiba, Ltd., Kyoto, Japan

[21] Appl. No.: 358,607

[22] Filed: Mar. 15, 1982

[30] Foreign Application Priority Data

Apr. 22, 1981 [JP] Japan .................................. 56-61681

[51] Int. Cl.³ .......................... H03K 7/04; H03K 9/04
[52] U.S. Cl. ........................................ 332/14; 329/50;
329/107; 329/122; 332/19; 375/23; 375/44;
375/81; 375/94
[58] Field of Search ................. 329/50, 102, 103, 107,
329/122, 124; 332/9 R, 9 T, 14, 19; 340/870.16,
870.17, 870.19, 870.2, 870.25, 870.26, 531, 533;
375/23, 44, 81, 94; 455/42

[56] References Cited

U.S. PATENT DOCUMENTS 4,052,672 10/1977 Enderby et al. ........................ 331/23
4,059,805 11/1977 de Laage de Meux et al. ... 329/107

FOREIGN PATENT DOCUMENTS 1128159 4/1962 Fed. Rep. of Germany .
1191593 4/1965 Fed. Rep. of Germany .

Primary Examiner—Eugene R. LaRoche
Assistant Examiner—Robert J. Pascal
Attorney, Agent, or Firm—Wenderoth, Lind & Ponack

[57] ABSTRACT

A two-wire type converter in which voltage signals detected by a detecting element of a pH meter, for example, are converted into current signals and the resulting current signals are transferred to an indicator of a measuring device or the like through a two-wire type transmission channel which also serves as a feed line of electric power for driving said converter. The two-wire type converter includes a first system which is physically located nearby a detecting element and a second system which is physically located far from the detecting element. The systems are electrically insulated from each other by means of a first insulated transformer and a second insulated transformer. The first system includes a phase modulation circuit consisting of a voltage comparator, a square wave oscillator, a first phase comparator and a first integrator circuit. The second system includes a demodulating circuit consisting of a reference square wave oscillator, a second phase comparator, a second integrator circuit and a voltage/current converter. The first system also includes a rectifying circuit and a voltage stabilizer for use as a power supply for driving the phase modulation circuit. Electric power is supplied from the reference square wave oscillator to the power supply through the first insulated transformer. The second system also includes a voltage stabilizer for use as a power supply for driving the demodulating circuit and square wave oscillator. Electric power is supplied from the two-wire type transmission channels to the voltage stabilizer.

4 Claims, 6 Drawing Figures

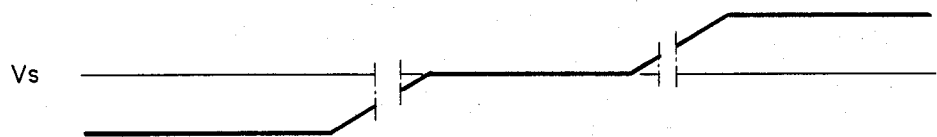
FIG. 2a.   Vs
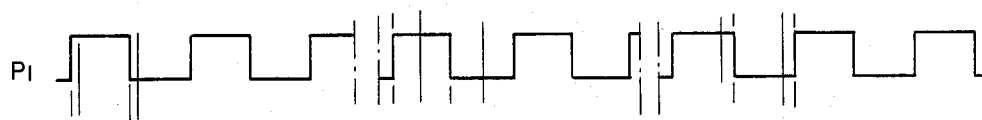
FIG. 2b.   P1
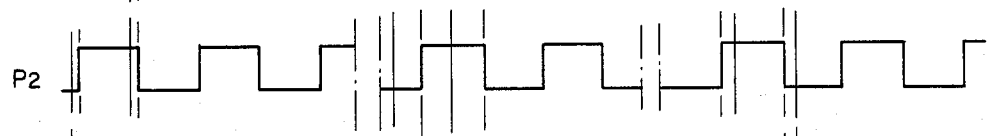
FIG. 2c.   P2
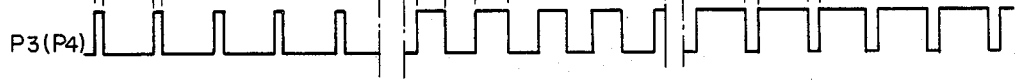
FIG. 2d.   P3(P4)
FIG. 3.
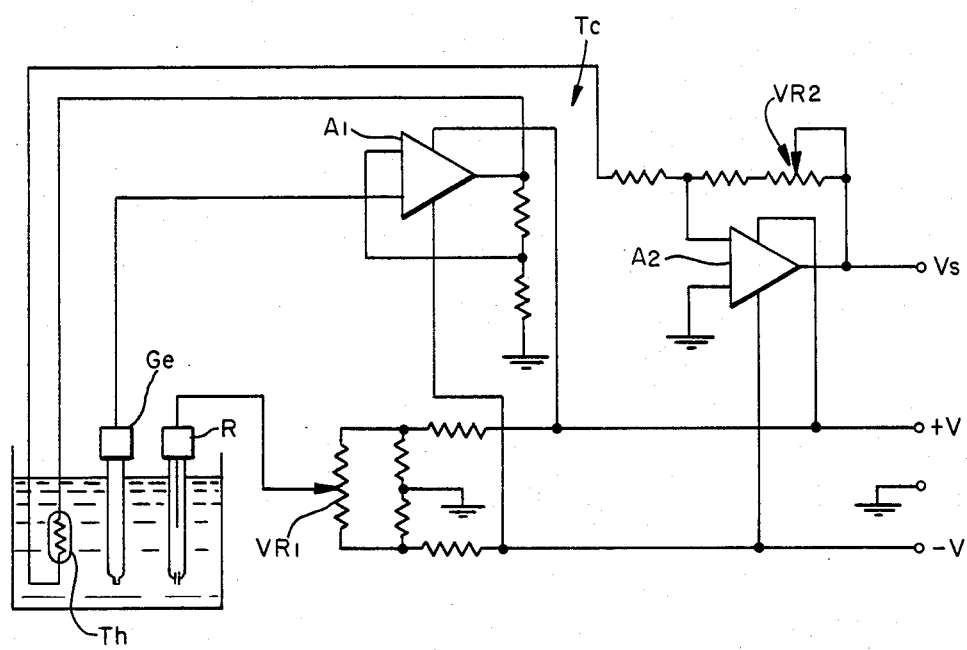

PULSE PHASE MODULATOR/DEMODULATOR SYSTEM

BACKGROUND OF THE INVENTION

1. Field of the Invention

The present invention relates to a two-wire type converter in which voltage signals detected by a detecting element of a pH meter, for example, are converted into current signals and the resulting current signals are transferred to an indicator of a measuring device or the like through a two-wire type transmission channel which also serves as a feed line of electric power for driving said converter. In particular, the present invention relates to a two-wire type insulated converter having a construction in which said converter is electrically separated and insulated into a system physically located near said detecting element and a system physically located far from said detecting element, said converter separarated by means of an insulated transformer so as to prevent measurement errors due to ground loop currents.

2. Description of the Prior Art

The separation of said converter into said circuit system physically located near said detecting element and said circuit system physically located far from said detecting element requires the modulation of voltage signals in order to transfer the information corresponding to said voltage signals of said detecting element from said circuit system near said detecting element to said circuit system far from said detecting element. Prior art systems include an amplitude modulation type system, as disclosed by Japanese Patent Publication No. 44,479/1979 (hereinafter referred to as an AM modulation type system) and a frequency modulation type system, as disclosed by Japanese Laid-Open Patent No. 137,368/1979 (hereinafter referred to as an FM modulation type system). However, in an AM modulation type system, said voltage signals output from said detecting element are transmitted in the form of changes in the carrier signal amplitude. It is, therefore, necessary that the unmodulated amplitude of the carrier signal be maintained at a constant level and not disturbed by changes in the system power source, or changes in system temperatures or the like. To this end, a sufficiently large electric power must be always supplied. This leads to a defect in that the power consumption is large. On the contrary, in an FM modulation type system, said voltage signals output from said detecting element are transmitted in the form of changes in the carrier signal frequency. It is therefore not necessary to keep the amplitude of the carrier stable as in an AM modulation type system. However, an FM modulation type system also has a defect in that the transmission efficiency of an insulated transformer and the power consumption of such a circuit are changed owing to the changes of the carrier frequency and the linearity characteristics are thereby deteriorated. In addition, such a system inevitably requires the use of special and expensive parts such as a voltage-frequency conversion circuit.

SUMMARY OF THE INVENTION

The present invention provides a two-wire type converter which can be driven with a remarkably low electric power consumption without any deterioration in its linearity characteristics by using a pulse phase modulation type system (hereinafter referred to as PPM modulation type system) which is different from said AM modulation type system and said FM modulation type system.

BRIEF DESCRIPTION OF THE DRAWINGS

FIGS. 2a–2d are the waveforms at various points of the system shown in FIG. 1.

FIG. 3 shows an amplifying circuit of a pH meter.

DESCRIPTION OF THE PREFERRED EMBODIMENT

Figure 1:
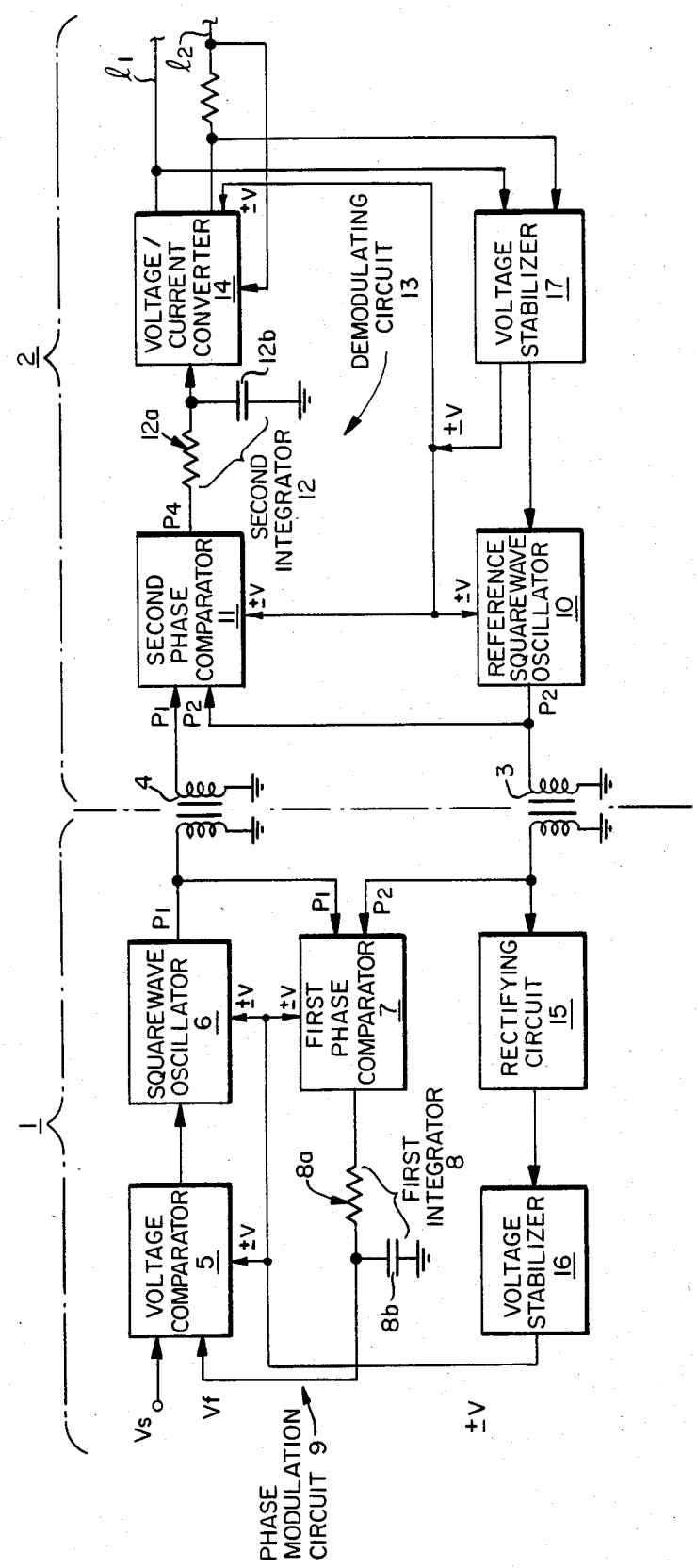
FIG. 1 is a block diagram showing an example of the present invention.

One of the preferred embodiments of the present invention will be described below by reference to the drawings. Referring now to FIG. 1, a two-wire type converter consists of a system 1 which is physically located nearby a detecting element (not shown) and a system 2 which is physically located far from said detecting element (not shown). Systems 1 and 2 are electrically insulated from each other by means of a first insulated transformer 3 and a second insulated transformer 4. Said system 1 includes a phase modulation circuit 9 consisting of a voltage comparator 5, a square wave oscillator 6, a first phase comparator 7 and a first integrator circuit 8. Said system 2 includes a demodulating circuit 13 consisting of a reference square wave oscillator 10, a second phase comparator 11 a second integrator circuit 12 and a voltage/current converter 14. Said system 1 also includes a commercially available rectifying circuit 15 and a commercially available voltage stabilizer 16 for use as a power supply for driving said phase modulation circuit 9. The stabilizer 16 generates stabilized positive and negative voltages used to drive the modulation circuit 9. Electric power is supplied from said reference square wave oscillator 10 to said power supply through said first insulated transformer 3. Said system 2 also includes a commercially available voltage stabilizer 17 for use as a power supply for driving said demodulating circuit 13 and square wave oscillator 10. Electric power is supplied from twowire type transmission channels $l_1$, $l_2$ to said voltage stabilizer 17. The stabilizer 17 generates stabilized positive and negative voltages used to drive the demodulating circuit 13.

A signal voltage $V_s$ and a feedback voltage $V_f$ are fed into said voltage comparator 5 and an output from said voltage comparator 5 is fed into said square wave oscillator 6. Said square wave oscillator 6 consists of, for example, a VCO (voltage control oscillator) IC, the phase of a square wave signal $P_1$ output from said square wave oscillator 6 is controlled by said output from said voltage comparator 5 (see $P_1$, FIG. 1 and FIG. 2b). Said square wave signal $P_1$ and a reference square wave signal $P_2$, which is obtained from said reference square wave oscillator 10 through said first insulated transformer 3 are input into said first phase comparator 7. Said first phase comparator 7 consists of, for example, a logic circuit (an Exclusive OR gate) which provides an output $P_3$ which is in correspondence with the phase difference between said square wave signal $P_1$ and said reference square wave signal $P_2$. In this case, said output $P_3$ from said first phase comparator 7 is a signal whose pulse width is in correspondence with the changes in phase of said square wave signal $P_1$ from said square wave oscillator 6 (see $P_3$, FIG. 2d) because said reference square wave oscillator 10 always provides a reference wave signal $P_2$ of a constant frequency. Said output $P_3$ is integrated by means of said first integrator circuit 8 having a resistor 8a and a capacitor 8b and then fed into said voltage comparator 5 as said feedback voltage $V_f$. Said feedback voltage $V_f$ is based on said square wave signal $P_1$, that is—based on said signal voltage $V_s$ of said detecting element and accordingly said feedback signal voltage changes depending upon said signal voltage $V_s$. Consequently, the phase of said square wave signal $P_1$ is controlled so that said feedback voltage $V_f$ is equal to said signal voltage $V_s$ and a phase modulation of said signal voltage $V_s$ is thereby carried out. The resulting square wave signal $P_1$, which has been subjected to a phase modulation, is fed into said second phase comparator 11 through said second insulated transformer 4. Said second phase comparator 11 consists of a logic circuit equivalent to said first phase comparator 7. Said reference square wave signal $P_2$ is also fed into said second phase comparator 11 in addition to said square wave signal $P_1$. An output $P_4$ from said second phase comparator 11 is fed into said second integrator circuit 12 including resistor 12a and capacitor 12b and having the same construction as said first integrator circuit 8. Thus, said square wave signal $P_1$ is demodulated so as to generate a voltage, which is equal to said signal voltage $V_s$ of said detecting element, said voltage being proportional to said signal voltage $V_s$ of said detecting element, by means of said second phase comparator 11 and said second integrator circuit 12. The resulting voltage is converted to a current signal by means of said voltage/current converter 14 and then sent to an input side of an external circuit (not shown) through said two-wire type transmission channels $l_1$, $l_2$.

In addition, a signal current, which is required for supplementing a circuit current of the two-wire type converter, is 4 to 20 mA as a rule. On the other hand, current consumption of said converter is 4 mA or less excluding the final stage current control element, in particular in case of the above described preferred embodiment said converter can be adequately operated at 2.0 mA or less. Consequently, a current of about 2 mA, which is an excess current assuming that said signal current is at most 4 mA, can operate additional circuits. In this case, it is desirable to select a circuit, which can receive a sensor signal to give said signal voltage $V_s$, as said additional circuit. FIG. 3 shows an amplifying circuit of a pH meter as a preferred example of said additional circuit. This known amplifying circuit of a pH meter consists of an amplifier $A_1$ for carrying out an impedance conversion of a signal arising from a glass electrode $G_e$, a temperature compensating circuit TC, which is connected to a thermistor Th, for compensating an influence by temperatures of said glass electrode $G_e$, a variable resistor VR1 for compensating a heterogeneous electric potential between said glass electrode and a reference electrode R, a variable resistor VR2 for compensating a deviation in the sensitivity of said glass electrode, and an amplifier $A_2$ for providing said signal voltage $V_s$ or the like. Referring now to FIG. 3, R designates the reference electrode. The current consumption of this circuit, which is 2 mA or less, can sufficiently operate with the converter as shown in FIG. 1.

Furthermore, said amplifying circuit can be connected with an ion electrode type sensor, an ORP electrode or the like instead of a pH meter. As a rule, it can be understood that also in those cases said amplifying circuit can act sufficiently as said additional circuit.

In addition, the circuits, which amplify an electric signal, which is obtained from the sensors based on the principle that they are directly contacted with the samples to be measured such as an electrode type conductivity meter, an electromagnetic flow meter and the like, to generate said signal voltage $V_s$, can also be used as said additional circuit, and these circuits are generally known to those skilled in the art.

A two-wire type converter of the present invention exhibits the following effects due to the above described construction:

(a) The voltage and frequency of a signal passing through said insulated transformer 3 and 4 are not changed because said PPM type modulation is used for transmitting said signal voltage $V_s$ arising from said detecting element from said system 1 which is physically located nearby said detecting element to said system 2 which can be physically located far from said detecting element. Consequently, the transmission efficiency of the transformer is not changed and the linearity characteristics thereof are thereby improved.

(b) It is necessary only to know the phase difference between said system located nearby said detecting element and said system located far from said detecting element and the value of voltage of said square wave signal may be changed due to the phase modulation and demodulation. Thus, the power consumption of said system can be remarkably reduced in comparison with an AM modulation type system. In fact, the power consumption can be reduced in half.

(c) The linearity and stability of said converter are not degraded even though the frequency is changed or the constants of said leveling circuit are changed while operating because of the fact that it is necessary only to know the phase difference as described in (b). Thus, the system does not require the high-grade parts incidental to an FM type modulation system, but can be constructed from only easily available and inexpensive parts.

(d) The system can provide larger signals than that of the conventional converter at the same power supply voltage because the power consumption is remarkably reduced. Furthermore, its use can be extended by connecting it to various sensors because electric power can be supplied to said additional circuits such as said amplifying circuit, said conversion circuit and the like arranged ahead of the signal input stage of the converter system of the present invention.

(e) A converter of the present invention exhibits an excellent overall performance and can be more widely used in comparison with prior art AM modulation type systems and FM modulation type systems because of the above described effects (a) to (d).

What is claimed is:

1. A two-wire type converter, comprising a first system located nearby a detecting element and electrically insulated from a second system located far from said detecting element, said first and second systems electrically insulated by means of a first insulated transformer and a second insulated transformer;

said first system comprising a phase modulation circuit including a voltage comparator for comparing a signal voltage with a feedback voltage of said detecting element; a square wave oscillator connected to said voltage comparator for controlling the phase of a square wave signal output therefrom in dependence upon an output of said voltage comparator; a first phase comparator connected to said square wave oscillator and said first insulated transformer for detecting a phase difference between said square wave signal output from said square wave oscillator and a reference square wave signal obtained through said first insulated transformer; a first integrator circuit connected to said first phase comparator for integrating an output from said first phase comparator and generating said feedback voltage fed to said voltage comparator;

said second system comprising a demodulation circuit including a reference square wave oscillator connected to said first insulated transformer for generating said reference square wave signal; a second phase comparator for detecting a phase difference between said reference square wave signal output from said reference square wave signal oscillator and said square wave signal output from said square wave oscillator obtained through said second insulated transformer; a second integrator circuit connected to said second phase comparator for integrating an output from said second phase comparator and a voltage/current converter connected to said second integrator for converting a voltage signal output from said second integrator circuit to a current signal which is output to a two-wire type transmission channel.

2. A two-wire type converter as set forth in claim 1, wherein said first system further includes a rectifying circuit connected to a voltage stabilizer for providing stabilized positive and negative voltages for electrically powering said phase modulation circuit, and wherein electric power is supplied from said reference square wave oscillator to said rectifying circuit through said first insulated transformer.

3. A two-wire type converter as set forth in claims 1 or 2, wherein said second system further includes a voltage stabilizer for providing stabilized positive and negative voltages for electrically powering said demodulation circuit and said voltage/current converter, and wherein additional electric power is supplied from said two-wire type transmission channel to said voltage stabilizer.

4. A two-wire type converter as set forth in claim 1, wherein said first phase comparator and said second phase comparator each comprise logic circuit means.

* * * * *